United States Patent
Egri et al.

(10) Patent No.: US 11,954,817 B2
(45) Date of Patent: *Apr. 9, 2024

(54) METHOD OF PLANE TRACKING

(71) Applicant: Snap Inc., Santa Monica, CA (US)

(72) Inventors: Ozi Egri, Yassur (IL); Eyal Zak, Megiddo (IL)

(73) Assignee: SNAP INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/318,472

(22) Filed: May 16, 2023

(65) Prior Publication Data

US 2023/0281750 A1    Sep. 7, 2023

Related U.S. Application Data

(63) Continuation of application No. 17/504,419, filed on Oct. 18, 2021, now Pat. No. 11,688,033, which is a continuation of application No. 16/881,924, filed on May 22, 2020, now Pat. No. 11,176,636, which is a continuation of application No. 16/067,506, filed as
(Continued)

(51) Int. Cl.
| | | |
|---|---|---|
| *G06T 3/00* | (2006.01) | |
| *G06T 7/246* | (2017.01) | |
| *G06T 7/33* | (2017.01) | |
| *G06T 7/73* | (2017.01) | |

(52) U.S. Cl.
CPC ............ *G06T 3/0006* (2013.01); *G06T 7/246* (2017.01); *G06T 7/33* (2017.01); *G06T 7/74* (2017.01)

(58) Field of Classification Search
CPC .................................................... G06T 3/0006
See application file for complete search history.

(56) References Cited

U.S. PATENT DOCUMENTS

| | | |
|---|---|---|
| 9,213,908 B2 | 12/2015 | Benhimane et al. |
| 9,985,786 B1 | 5/2018 | Bhabbur et al. |
| (Continued) | | |

FOREIGN PATENT DOCUMENTS

WO    WO-2017115271 A1    7/2017

OTHER PUBLICATIONS

"U.S. Appl. No. 16/067,506, Examiner Interview Summary dated Dec. 13, 2019", 3 pgs.
(Continued)

*Primary Examiner* — Edward Park
(74) *Attorney, Agent, or Firm* — SCHWEGMAN LUNDBERG & WOESSNER, P.A.

(57) ABSTRACT

A method of plane tracking comprising: capturing by a camera a reference frame of a given plane from a first angle; capturing by the camera a destination frame of the given plane from a second angle different than the first angle; defining coordinates of matching points in the reference frame and the destination frame; calculating, using the first and second angles, first and second respective rotation transformations to a simulated plane parallel to the given plane; applying an affine transformation between the reference frame coordinate on the simulated plane and the destination frame coordinate on the simulated plane; and applying a projective transformation on the simulated plane destination frame coordinate to calculate the destination frame coordinate.

13 Claims, 4 Drawing Sheets

Related U.S. Application Data application No. PCT/IB2016/058014 on Dec. 27, 2016, now Pat. No. 10,692,172.

(60) Provisional application No. 62/272,717, filed on Dec. 30, 2015.

(56) References Cited

U.S. PATENT DOCUMENTS

| | | | |
|---|---|---|---|
| 10,692,172 B2* | 6/2020 | Egri | G06T 7/74 |
| 11,176,636 B2 | 11/2021 | Egri et al. | |
| 11,688,033 B2* | 6/2023 | Egri | G06T 7/74 |
| | | | 382/296 |
| 2005/0008256 A1* | 1/2005 | Uchiyama | G06T 7/80 |
| | | | 382/291 |
| 2006/0188131 A1 | 8/2006 | Zhang et al. | |
| 2010/0020201 A1 | 1/2010 | Chao et al. | |
| 2012/0058824 A1 | 3/2012 | Raptis et al. | |
| 2013/0336583 A1* | 12/2013 | Ernst | G06T 7/80 |
| | | | 382/218 |
| 2015/0189178 A1 | 7/2015 | Lombardi et al. | |
| 2016/0292831 A1 | 10/2016 | Bogan | |
| 2019/0012765 A1 | 1/2019 | Egri et al. | |
| 2020/0294186 A1 | 9/2020 | Egri et al. | |
| 2022/0036502 A1 | 2/2022 | Egri et al. | |

OTHER PUBLICATIONS

"U.S. Appl. No. 16/067,506, Non Final Office Action dated Sep. 25, 2019", 10 pgs.

"U.S. Appl. No. 16/067,506, Notice of Allowance dated Feb. 18, 2020", 8 pgs.

"U.S. Appl. No. 16/067,506, Preliminary Amendment Filed Jun. 29, 2017", 7 pgs.

"U.S. Appl. No. 16/067,506, Response filed Jan. 22, 2020 to Non Final Office Action dated Sep. 25, 2019", 12 pgs.

"U.S. Appl. No. 16/881,924, Notice of Allowance dated Jul. 13, 2021", 9 pgs.

"U.S. Appl. No. 16/881,924, Preliminary Amendment filed Jun. 5, 2020", 8 pgs.

"U.S. Appl. No. 17/504,419, Non Final Office Action dated Oct. 28, 2022", 7 pgs.

"U.S. Appl. No. 17/504,419, Notice of Allowance dated Feb. 14, 2023", 9 pgs.

"U.S. Appl. No. 17/504,419, Response filed Jan. 20, 2023 to Non Final Office Action dated Oct. 28, 2022", 6 pgs.

"International Application Serial No. PCT/IB2016/058014, International Preliminary Report on Patentability dated Jul. 12, 2018", 7 pgs.

"International Application Serial No. PCT/IB2016/058014, International Search Report dated Mar. 23, 2017", 3 pgs.

"International Application Serial No. PCT/IB2016/058014, Written Opinion dated Mar.23, 2017", 5 pgs.

U.S. Appl. No. 16/067,506 10,692,172, filed Jun. 29, 2018, Method of Plane Tracking.

U.S. Appl. No. 16/881,924 11,176,636, filed May 22, 2020, Method of Plane Tracking.

U.S. Appl. No. 17/504,419, filed Oct. 18, 2021, Method of Plane Tracking.

* cited by examiner

METHOD OF PLANE TRACKING

CROSS-REFERENCE TO RELATED PATENT APPLICATIONS

This application is a continuation of U.S. patent application Ser. No. 17/504,419, filed Oct. 18, 2021, which application is a continuation of U.S. patent application Ser. No. 16/881,924, filed on May 22, 2020, now issued as U.S. Pat. No. 11,176,636, which is a continuation of U.S. patent application Ser. No. 16/067,506, filed on Jun. 29, 2018, now issued as U.S. Pat. No. 10,692,172, which is a U.S. national-phase application filed under 35 U.S.C. § 371 from International Patent Application Serial No. PCT/IB2016/058014, filed on Dec. 27, 2016, and published on Jul. 6, 2017 as WO 2017/115271, which claims the benefit of priority of U.S. Provisional Patent Application Ser. No. 62/272,717, filed on Dec. 30, 2015, the benefit of priority of each of which are claimed hereby and each of which are incorporated by reference herein in their entirety.

BACKGROUND

Tracking a plane (e.g. floor) with a single camera is a problem solved by a projective transformation. A projective transformation maps lines to lines (but does not necessarily preserve parallelism). Any plane projective transformation can be expressed by an invertible 3×3 matrix in homogeneous coordinates; conversely, any invertible 3×3 matrix defines a projective transformation of the plane. Projective transformations (if not affine) are not defined on all of the plane, but only on the complement of a line (the missing line is "mapped to infinity"). A projective transformation has eight degrees of freedom (8 DOF), and is not a linear transformation and thus, difficult to deal with. A transformation that preserves lines and parallelism (maps parallel lines to parallel lines) is an affine transformation. An affine transformation has six degrees of freedom.

SUMMARY

According to aspects of the present invention there is provided a method of plane transformation comprising: capturing by a first camera a reference frame of a given plane from a first angle; capturing by a second camera a destination frame of said given plane from a second angle different than said first angle; defining coordinates of matching points in said reference frame and said destination frame; using said first and second angles to calculate first and second respective rotation transformations to a simulated plane parallel to said given plane; applying an affine transformation between said reference frame coordinate on said simulated plane and said destination frame coordinate on said simulated plane; and applying a projective transformation on said simulated plane destination frame coordinate to calculate said destination frame coordinate.

The angles may be provided by at least one inertial measurement unit attached to said camera.

Calculating first and second rotation transformations to a simulated plane may comprise calculating Euler angles.

Calculating first and second respective rotation transformations to a simulated plane parallel to said given plane comprises, for each said defined coordinates: applying a first projective transformation on said reference frame coordinate to calculate said reference frame coordinate on said simulated plane; and applying a second projective transformation on said destination frame coordinate to calculate said destination frame coordinate on said simulated plane.

The first camera and the second camera may be the same camera.

BRIEF DESCRIPTION OF THE DRAWINGS

For better understanding of the invention and to show how the same may be carried into effect, reference will now be made, purely by way of example, to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION

The following description is presented to enable one of ordinary skill in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In other instances, well-known methods, procedures, and components have not been described in detail so as not to obscure the present invention.

In the following detailed description, numerous specific details are set forth in order to provide a thorough understanding of the present invention. However, it will be understood by those skilled in the art that the present invention maybe practiced without these specific details.

The present invention provides a method of linearizing the problem of plane tracking, by reducing the problem to an affine problem. The method uses data from at least one camera and at least one inertial measurement unit such as a gyro device mounted in the same device as the camera, e.g. a smart phone.

The process starts with capturing a plane (e.g. floor) from two different angles. The process then comprises two stages:

Preprocessing Stage

In this stage the inputs to the algorithm are a set of matching points and three rolling angles of the device(s) from the two scenes (frames) captured from different angles. We will refer to the two scenes as reference and destination scenes.

We use feature matching and tracking techniques such as SIFT, SURF, KAZE, Optic Flow etc. in order to match features of the two scenes, resulting in N tracking points, where N can be a large number (e.g. several hundred points).

Figure 1:
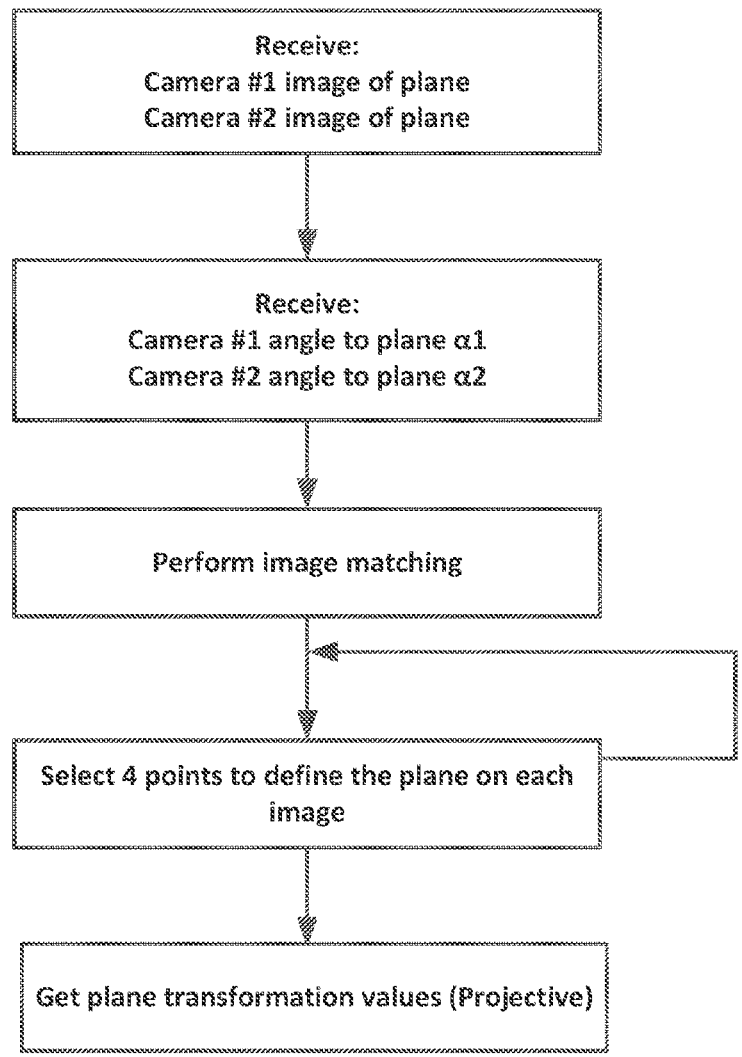
FIG. 1 is a flowchart showing prior-art methods of calculating plane transformation by projective transformation.

Unlike prior art techniques that use the RANSAC (Random Sample Consensus) algorithm iteratively to select the best four points that define the plane out of the N tracking points, as shown in the flowchart of FIG. 1, the method of the present invention processes each tracking point once, as will be explained in details below.

Figure 2:
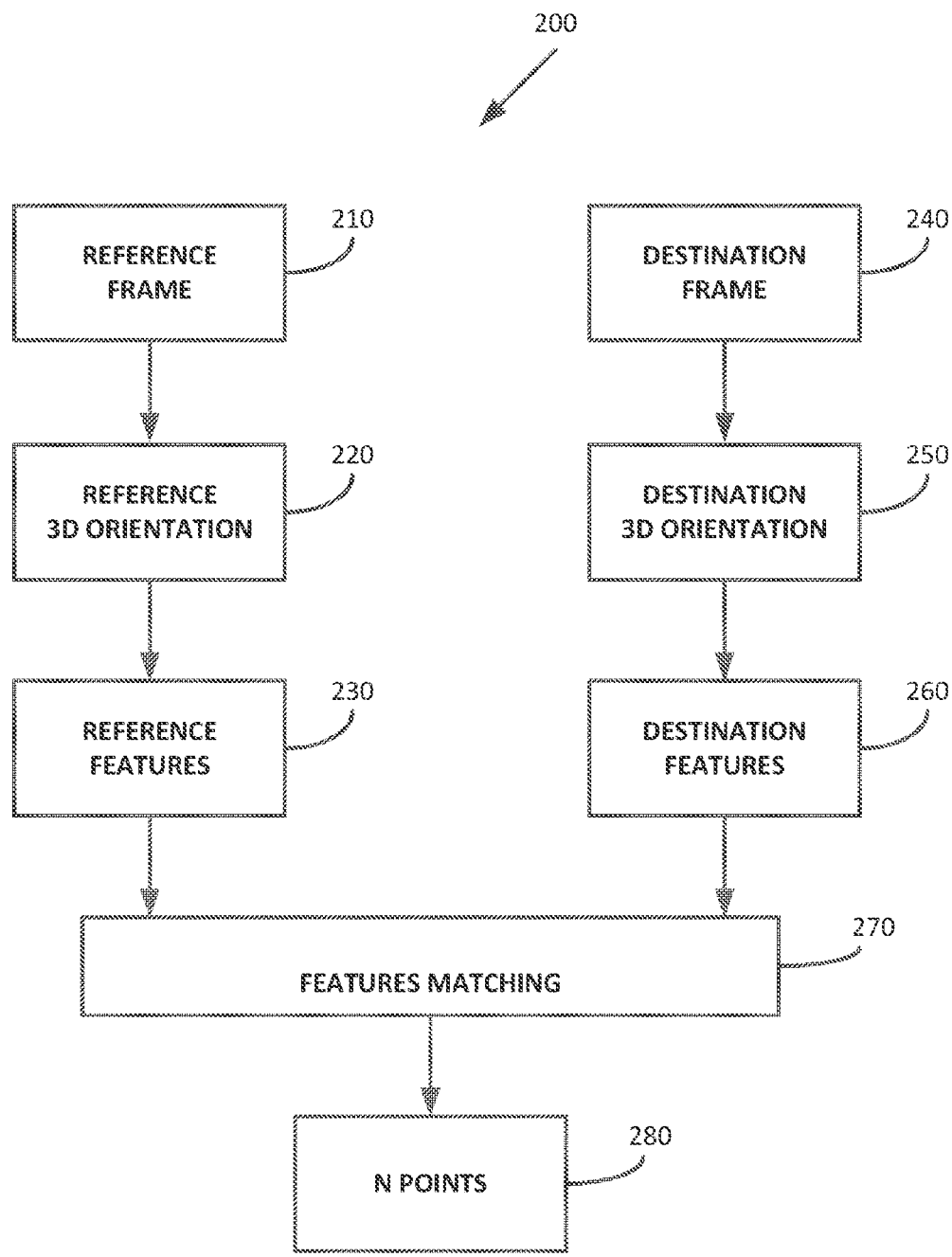
FIG. 2 is a flowchart showing the preprocessing phase according to the present invention.

The preprocessing flowchart 200 is shown in FIG. 2.

In steps 210 and 240 the reference frame and the destination frame are provided respectively.

In steps 220 and 250 the 3D orientations of both frames are calculated by calculating Euler angles (for example, using gyro, acceletometer or other inertial measurement units attached to the capturing device or devices).

In steps 230 and 260 reference points are extracted (using various methods of feature extraction, such as SIFT, SURF, KAZE) from both frames.

In step 270 the extracted points from both frames are matched (using various methods of feature matching such as FLANN matcher).

In step 280 N resulting tracking points are determined.

Data Processing

Figure 3:
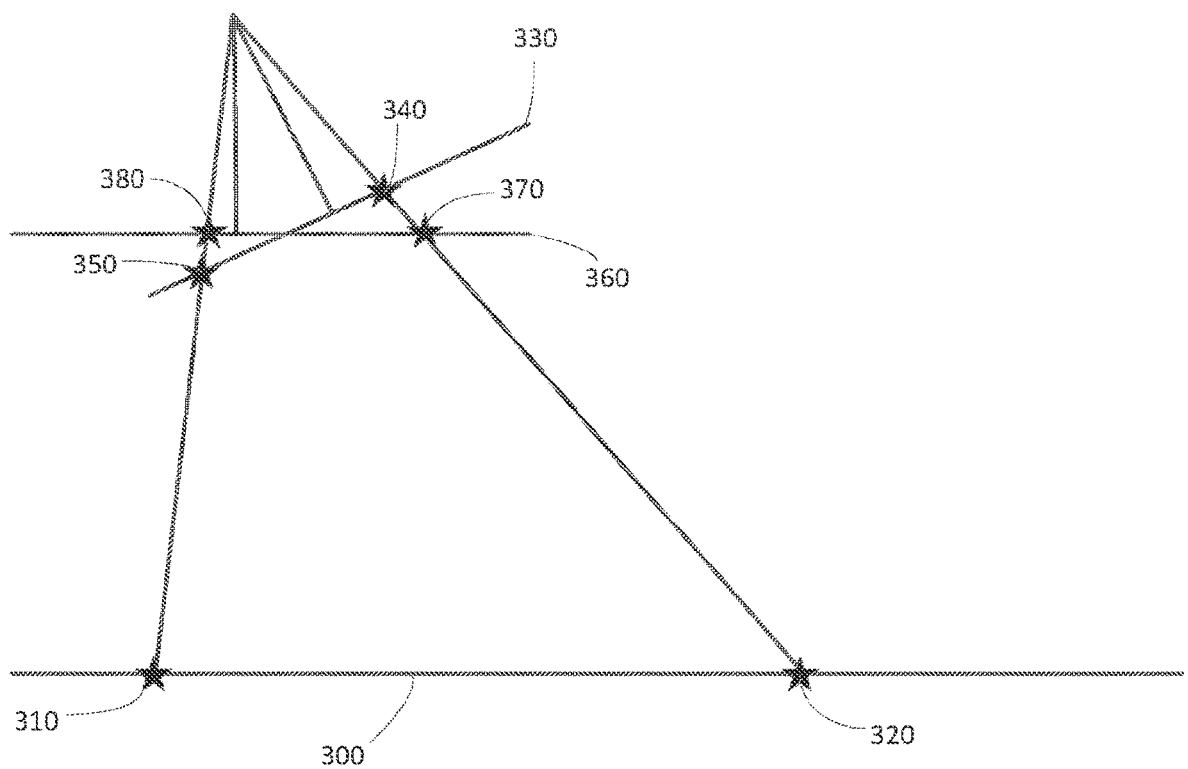
FIG. 3 is a graphic representation of the normalization phase according to the present invention.

FIG. 3 is a graphic representation of the normalization phase according to the present invention.

Figure 4:
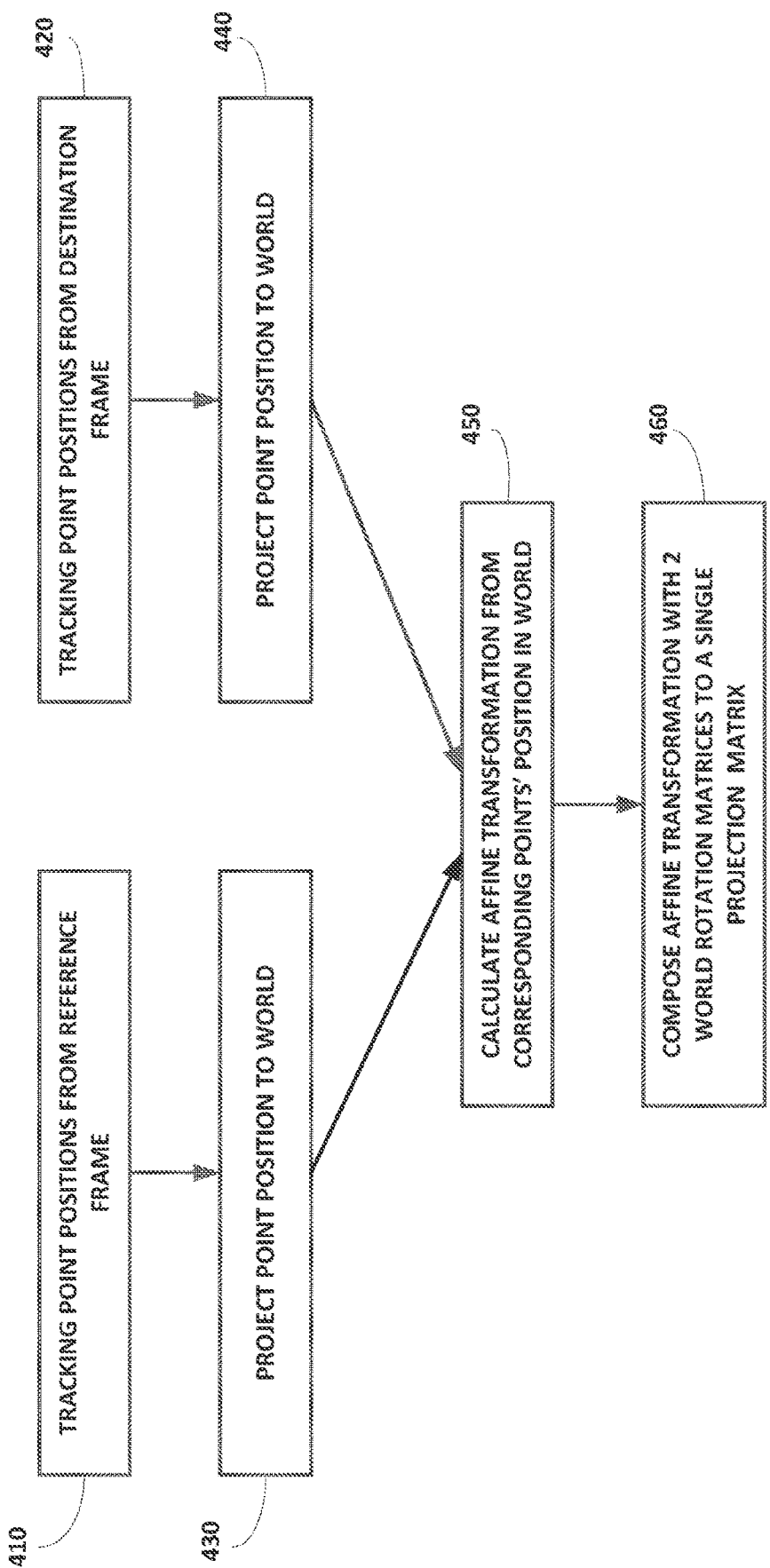
FIG. 4 is a flowchart showing the steps taken by the method of the present invention to achieve a projective transformation.

FIG. 4 is a flowchart showing the steps taken by the system to achieve a projective transformation according to the present invention.

1. Normalization phase: The method of the present invention relies on the fact that as long as the one or more camera are parallel to the plane, the transformation of the plane image between the two frames will be affine.

In steps 400 and 410 the position of each tracking point is provided from the reference frame and from the destination frame, respectively. In steps 430 and 440 the Euler angles for representing the spatial orientation of each one of the two frames are calculated (using, for example, the device's gyros and accelerometers), thus simulating rotation of the two scenes to the same orientation, so that in the rotated scenes each "rotated device" is facing the plane, as shown in FIG. 3, showing a plane (e.g. floor) 300 with two features 310, 320. The original captured plane image 330 shows the two respective features 340 and 350 and the simulated rotated plane image 360 shows the two respective features 370 and 380. The transformation is achieved using each device's gyros and accelerometers.

2. In step 450, after the normalization phase, the points are affine matched (a linear transformation). In step 460 a projective transformation is composed from the two rotation transformations and the affine transformation:

$$(X,Y)=\text{InvRotDst}(\text{AffineTrns}(\text{RotRef}(x,y)))$$

Where:

(x,y)—coordinates in reference frame (scene);

RotRef—rotation transformation of reference frame used in the normalization phase;

InvRotDst—inverse rotation transformation of destination frame;

AffineTrns—the affine transformation found in the affine matching stage;

(X,Y)—the destination coordinates.

The foregoing description of the embodiments of the invention has been presented for the purposes of illustration and description. It is not intended tube exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

The invention claimed is:

1. A method comprising:
    receiving a reference frame of a given plane from a first angle;
    receiving a destination frame of the given plane from a second angle different than the first angle;
    determining a set of matching tracking points based on the reference frame and the destination frame;
    calculating, using the first angle, a first rotation transformation to a simulated plane parallel to the given plane;
    calculating, using the second angle, a second rotation transformation to the simulated plane parallel to the given plane and the second rotation transformation is an inverse rotation transformation;
    calculating, based on the set of matching tracking points, an affine transformation between a first set of coordinates of the reference frame on the simulated plane and a second set of coordinates of the destination frame on the simulated plane; and
    applying a projective transformation to the simulated plane to calculate a set of destination frame coordinates, the projective transformation comprising:
        generating a first result by applying the first rotation transformation to the first set of coordinates of the reference frame;
        generating a second result by applying the affine transformation to the first result; and
        generating a third result by applying the second rotation transformation to the second result, the third result comprising the set of destination frame coordinates.

2. The method of claim 1, wherein the reference frame and the destination frame are captured by a same camera.

3. The method of claim 2, wherein the first angle and the second angle are provided by at least one inertial measurement unit attached to the same camera.

4. The method of claim 1, wherein the first angle and the second angle are provided by at least one inertial measurement unit attached to a first camera used to capture the reference frame or a second camera user to capture the destination frame.

5. The method of claim 1, wherein the calculating of the first rotation transformation to the simulated plane to the given plane comprises calculating an Euler angle.

6. The method of claim 1, wherein the calculating of the second rotation transformation to the simulated plane to the given plane comprises calculating an Euler angle.

7. A device comprising:
    a processor configured to perform operations comprising:
        receiving a reference frame of a given plane from a first angle;
        receiving a destination frame of the given plane from a second angle different than the first angle;
        determining a set of matching tracking points based on the reference frame and the destination frame;
        calculating, using the first angle, a first rotation transformation to a simulated plane parallel to the given plane;
        calculating, using the second angle, a second rotation transformation to the simulated plane parallel to the given plane and the second rotation transformation is an inverse rotation transformation;

calculating, based on the set of matching tracking points, an affine transformation between a first set of coordinates of the reference frame on the simulated plane and a second set of coordinates of the destination frame on the simulated plane; and applying a projective transformation to the simulated plane to calculate a set of destination frame coordinates, the projective transformation comprising:

generating a first result by applying the first rotation transformation to the first set of coordinates of the reference frame;

generating a second result by applying the affine transformation to the first result; and generating a third result by applying the second rotation transformation to the second result, the third result comprising the set of destination frame coordinates.

8. The device of claim 7, wherein the first angle and the second angle are provided by at least one inertial measurement unit attached to a first camera used to capture the reference frame or a second camera user to capture the destination frame.

9. The device of claim 7, comprising a single camera, the reference frame and the destination frame being captured by the single camera.

10. The device of claim 9, wherein the first angle and the second angle are provided by at least one inertial measurement unit attached to the single camera.

11. The device of claim 10, comprising the at least one inertial measurement unit.

12. The device of claim 7, wherein the calculating of the first rotation transformation to the simulated plane to the given plane comprises calculating an Euler angle.

13. The device of claim 7, wherein the calculating of the second rotation transformation to the simulated plane to the given plane comprises calculating an Euler angle.

\* \* \* \* \*